(12) United States Patent
Moe et al.

(10) Patent No.: US 6,247,313 B1
(45) Date of Patent: Jun. 19, 2001

(54) PLANT FOR EXPLOITING GEOTHERMAL ENERGY

(76) Inventors: Per H. Moe, Amtmann Bangs gate 7, N-3000 Drammen; Kjell M. Rabben, Gravarslia 30, N-4300 Sandnes, both of (NO)

( * ) Notice: Subject to any disclaimer, the term of this patent is extended or adjusted under 35 U.S.C. 154(b) by 0 days.

(21) Appl. No.: 09/308,519
(22) PCT Filed: Nov. 24, 1997
(86) PCT No.: PCT/NO97/00314
   § 371 Date: May 20, 1999
   § 102(e) Date: May 20, 1999
(87) PCT Pub. No.: WO98/22760
   PCT Pub. Date: May 28, 1998

(30) Foreign Application Priority Data

Nov. 22, 1996 (NO) ................... 964971

(51) Int. Cl.⁷ ........................... F03G 7/00
(52) U.S. Cl. .................. 60/641.2; 60/641.5
(58) Field of Search .............. 60/641.2, 641.5

(56) References Cited

U.S. PATENT DOCUMENTS

| | | | |
|---|---|---|---|
| 3,682,246 | * 8/1972 | Closmann | 166/271 |
| 3,810,510 | * 5/1974 | Fitch et al. | 166/271 |
| 3,863,709 | 2/1975 | Fitch . | |
| 3,878,884 | * 4/1975 | Raleigh | 165/1 |
| 4,015,663 | * 4/1977 | Strubhar | 166/258 |
| 4,223,729 | 9/1980 | Foster . | |
| 5,515,679 | 5/1996 | Shulman . | |
| 5,697,218 | * 12/1997 | Shnell | 60/641.2 |

FOREIGN PATENT DOCUMENTS

| | | |
|---|---|---|
| 42 29 185 A 1 | 3/1994 | (DE) . |
| 2 318 396 | 2/1977 | (FR) . |
| WO 91/03690 | 3/1991 | (WO) . |
| WO 96/23181 | 8/1996 | (WO) . |

OTHER PUBLICATIONS

Derwent Abstract, No. 97–144168/13, Week 9713, Abstract of RU, 2064141 (Feldman B Ya). Jul. 20, 1996.

* cited by examiner

*Primary Examiner*—Hoang Nguyen
(74) *Attorney, Agent, or Firm*—Frommer Lawrence & Haug, LLP; William S. Frommer

(57) ABSTRACT

A plant for exploiting geothermal energy by circulating water through a geological formation (1) at a substantial depth below the earth surface (2), comprises at least one supply hole (3) leading from the surface (2) down to said formation (1) and at least one return hole (4) for transporting heated water from the formation to the surface. The supply and return holes (3, 4) are interconnected by a plurality of heat absorbing holes (5) which are spaced more than 50 m apart. The heat absorbing holes (5) have a total length of many kilometers but a relatively small diameter in the order of 10 cm. A method for designing the plant involving determining the dimensions of the heat transfer holes (5) is also disclosed.

21 Claims, 2 Drawing Sheets

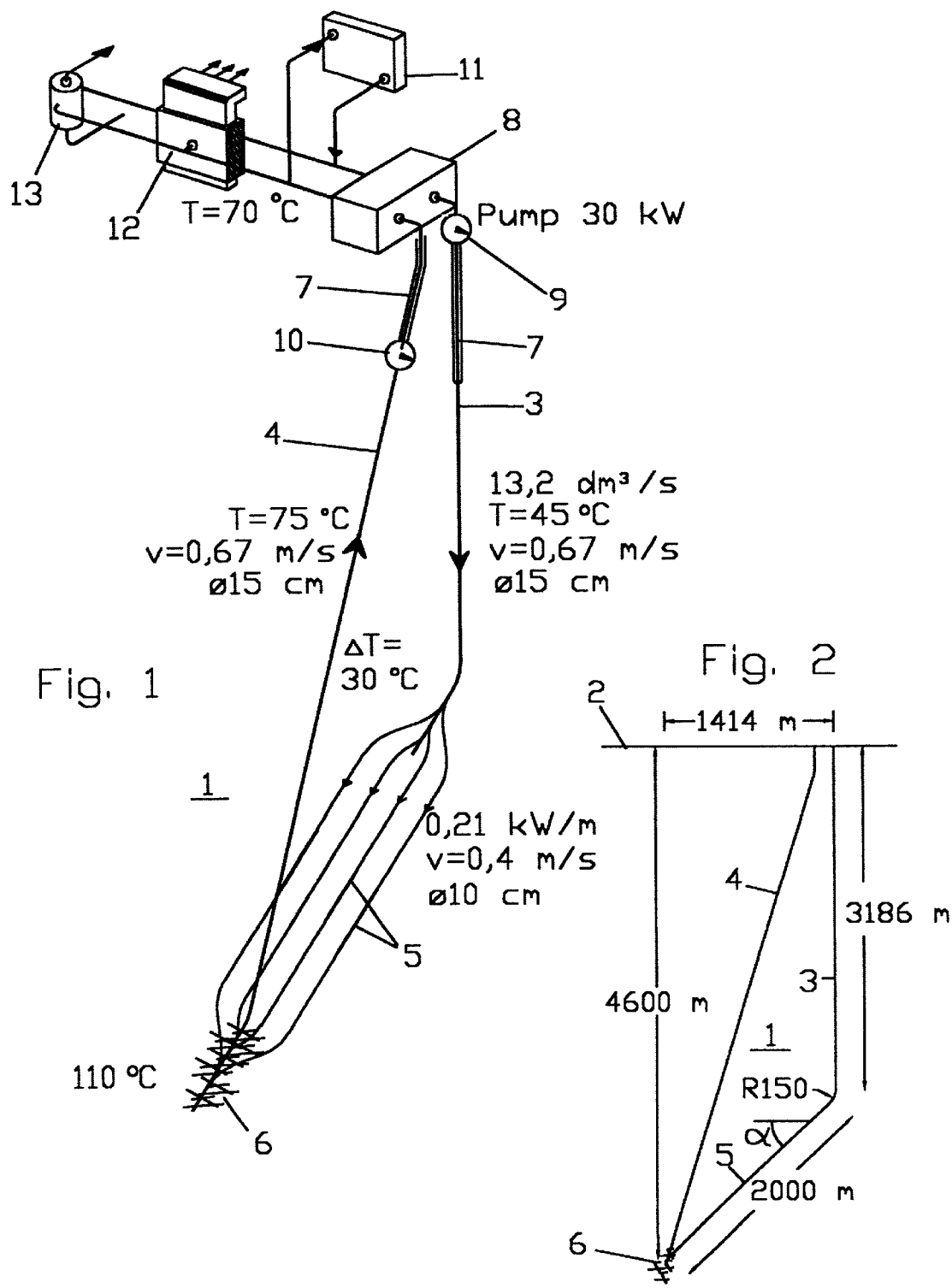

PLANT FOR EXPLOITING GEOTHERMAL ENERGY

Figure 3:
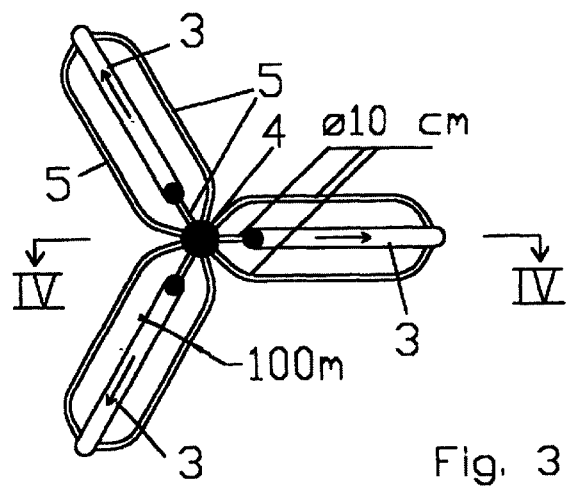

The present invention relates to a plant for exploiting geothermal energy by circulating water through a geological formation at least 1000 m below the earth surface, comprising at least one supply hole leading from the surface down to said formation, at least one return hole for the transport of heated water from said formation to the surface, and a heat absorbing arrangement connecting the supply and return holes, said arrangement comprising a heat transfer surface across which heat is transferred from said formation to said water.

An example of such a plant is disclosed in U.S. Pat. Nos. 3,863,709 and 4,223,729, the latter and other patents mentioned therein being included by reference. U.S. Pat. No. 4,223,729 relates to the exploitation of geothermal energy from hot dry rock (HDR) formations. Due to the low thermal conductivities of such formations, it has been the general belief that thermal energy could not be extracted at a useful rate without a very large heat transfer surface being available in the geological formation.

Up to now, in almost all known plants in HDR one has tried to obtain such very large heat transfer surface areas by creating fracture zones between the supply and return holes, either by expanding existing fracture zones, by blasting the rock between the holes using explosives, or by establishing a fracture system through the use of hydrostatic pressure and/or heat. Even if such fracture zones could be established, they provide rather unpredictable flow conditions for the water since the water tends to take the path of least resistance and therefore not flow through the narrower fissures of the fracture zone.

Quite contrary to the common belief, the present inventors have surprisingly realized that if a geothermal plant of the type in question is to have any useful life, the magnitude of the heat transfer surface area is not a critical factor. Instead, the decisive factor is the availability of a large volume of rock in close proximity to the heat transfer surface. Thus, the inventors believe that a geothermal plant, e.g. designed for heating and hot water purposes, should have at least 15,000 $m^3$ of rock located within 50 m of the heat transfer surface for every kW the plant is to deliver. For smaller plants in unfavourable rock conditions, this volume may be more like 60,000 $m^3$/kW.

Consequently, in one aspect of the invention, it provides a plant for exploiting geothermal energy of the kind defined in the introductory paragraph above, the plant being characterized in that it has a given nominal power in MW defined as the heat to be absorbed by said arrangement after one year of operation, in that said heat transfer surface comprises at least one drilled heat absorbing hole, and in that the volume of said formation located within 50 m of said heat absorbing hole, is at least about $10 \times 10^6$ $m^3$, preferably at least $20 \times 10^6$ $m^3$, multiplied by said nominal power.

These numbers represent a much larger mass of rock than contemplated by any prior art plant with an economically viable output.

The inventors have found that the most efficient way of establishing a sufficiently large volume of rock in close proximity to the heat transfer surface would be to use a drilled hole for said surface. However, such a hole would have to be quite long to penetrate the required volume of rock, and the drilling costs would appear prohibitive since one still had to assume that a substantial heat transfer surface, i.e. large diameter hole, would be necessary to provide the required heat flux from the rock to the water circulating through the hole.

Nevertheless, the inventors set out to calculate the heat transfer from a large cylinder of rock into water flowing in a central hole of the cylinder using the differential equation presented by H. S. Carslaw and J. C. Jaeger in "Conduction of Heat in Solids", Second Edition, Oxford, which is hereby included by reference, a task that to their knowledge nobody had done before. Surprisingly, they found that in the course of 30–40 years, the temperature in the rock at a distance of 100 m from the hole would hardly change at all. Even more surprisingly, they found that the available energy could be extracted over this time period with a hole which, from a heat transfer point of view, had a diameter as small as 10 cm and even less. Further analysis showed that increasing the hole diameter to 1 m, which would increase the heat transfer surface tenfold, would less than double the possible heat extraction rate, other conditions being held equal. However, the cross-sectional area of such a hole, and therefore the mass having to be removed to make the hole, would increase 100 times. Consequently, the most economical solution seemed to be to use the smallest hole diameter that could be drilled over long distances, which with the current technology is limited to about 10 cm.

However, the length of such a heat absorbing hole would normally exceed 5 km even for the smallest practical economical plant and, in addition, the supply and return holes could extend for much the same distance. Besides, the pressure drop and consequent pump losses could be too large for very long slender holes. To solve this problem, the inventors have suggested to divide the heat absorbing hole into a plurality of passes connected in parallel and being spaced sufficiently apart to have available a sufficient volume of rock to supply the desired heat through the required lifetime of the plant.

Thus, according to a second aspect, the invention provides a plant for exploiting geothermal energy by circulating water through a geological formation at least 1000 m below the earth surface, comprising at least one supply hole leading from the surface down to said formation, at least one return hole for the transport of heated water from said formation to the surface, and a heat absorbing arrangement connecting the supply and return holes, the plant being characterized in that said heat absorbing arrangement comprises a plurality of drilled heat absorbing holes connecting the supply and return holes in a parallel flow manner, a substantial part of each heat absorbing hole lying at least 50 m, preferably at least 100 m, from the nearest heat absorbing hole, the total length of the heat absorbing holes preferably exceeding 5000 m.

According to a further aspect of the present invention, a plant for exploiting geothermal energy of the type recited in the classifying part of the above paragraph is characterized in that said heat absorbing arrangement comprises a plurality of drilled heat absorbing holes arranged in parallel flow relationship, said heat absorbing holes extending at an angle downwards from the supply hole to the return hole.

The sloping of the heat absorbing holes makes them simpler to drill, for instance by using a water driven percussion hammer and coiled tubing. The weight on the drill bit can more easily be controlled since the friction of the coiled tubing against the hole wall can substantially support the weight of the tubing. This may considerably increase drill bit life and reduce drilling costs.

Since the rock temperature increases with increasing depth, letting the water flow direction be downward through the sloping holes will permit the temperature increase in the water to follow the temperature increase in the surrounding rock, thus keeping the temperature difference between the rock and water substantially constant. This may be likened to a countercurrent flow heat transfer arrangement and will allow for a shorter length of heat absorbing hole and an optimum absorption of heat from the rock. A countercurrent flow arrangement would be expected to produce heat from the same rock volume for 2–3 times longer than an equivalent co-current heat transfer arrangement.

The magnitude of the sloping angle will depend on several factors, for instance the temperature gradient in the rock, the length of the heat absorbing hole and the water flow rate. Calculating the angle will be well within the capabilities of the skilled person and will therefore not be detailed here. The angle would normally lie between 20° and 50°, preferably it will be about 40°.

Furthermore, in order to maximize the extraction of heat from a given volume of rock, at least substantial parts of the heat absorbing holes extend parallel to each other. More preferably, the heat absorbing holes are arranged in one layer or, if necessary, in a plurality of vertically spaced layers. Providing an array of vertically spaced layers, each layer having a plurality of heat absorbing holes, allows for increasing the capacity of the plant without spreading the holes over a wide area. This is of considerable importance if the volume of earth available for exploitation is not large.

Preferably the distance between adjacent holes in each layer is the same as the distance between adjacent vertically spaced holes, this distance being at least 50 m, preferably at least 100 m. On the other hand, the spacing should be less than about 150 m to limit the physical extent of the plant. A plant in accordance with the invention may have just a single supply hole and a single return hole. However, the plant may have a plurality of holes arranged, most preferably circumferentially equispaced, around a common return hole. In one particular embodiment for example three supply holes may be arranged around a single return hole. It should be noted that the return hole may be a single drilled hole or a cluster of closely spaced, smaller diameter holes, which exhibit substantially the same heat loss characteristics as a larger diameter single hole.

Preferably the upper ends of the supply hole and the return hole may be arranged close to one another, with the holes diverting downwards so as to introduce a substantial spacing between the ends of the heat absorbing holes extending therebetween. Preferably this spacing is at least 500 m. Such a plant arrangement allows for a compact plant construction at the surface but at the same time permitting the necessary heat absorbing hole length to be obtained. Since the heat absorbing holes normally will be drilled starting from the supply hole, the supply hole may advantageously be made generally vertical, thus permitting the heat absorbing holes to reach the greatest possible depth (and temperature) permitted by a given maximum length of the drill string available for drilling the holes. Using a coiled tubing, the practical maximum length may be 6–8000 m.

As mentioned earlier, it has previous been considered necessary to have very large heat transfer surfaces to extract thermal energy, as exemplified by the large fracture surface attempted according to U.S. Pat. No. 4,223,729. However, since the inventors very unexpectedly have found that heat can be extracted quite satisfactorily through heat absorbing holes having a diameter in the order of 10 cm or even less, this is in itself believed to be a novel arrangement, so that in accordance with a yet further aspect of the present invention, there is provided a plant of the type disclosed in the introductory paragraph, the plant being characterized by a heat absorbing arrangement comprising a plurality of drilled heat absorbing holes having a diameter of less than 14 cm, and preferably a nominal diameter of 10 cm.

The invention also provides a method for use in designing a geothermal plant, the method being defined in claim 15.

Further advantageous features of the invention are defined in the dependent claims.

It has come to the attention of the inventors that WO 96/23181 discloses an attempt to utilize abandoned offshore oil wells in extracting thermal energy, which in turn is supposed to be converted to electric power and supplied to a consumer. Here, two 3000 m deep wells are used for the supply and return holes, respectively, the wells being interconnected at their lower ends by a generally horizontally drilled loop which is 1000 m long and has a diameter of 21.5 cm. 700 m$^3$/h of water are circulated through the loop with an inlet temperature of 20° C. The publication simply assumes that the water will return at a temperature of 90° C., which is the temperature of the formation where the connecting loop is situated, and thus provide 40 MW of thermal power. This assumption is grossly inaccurate. Using their method referred to above, the inventors have found that the return water temperature would be just a few degrees above the supply temperature and that the loop would have to be more than 60 times longer in order to provide 40 MW. This clearly goes to show the usefulness, importance and surprising effect of the present invention.

Figure 4:
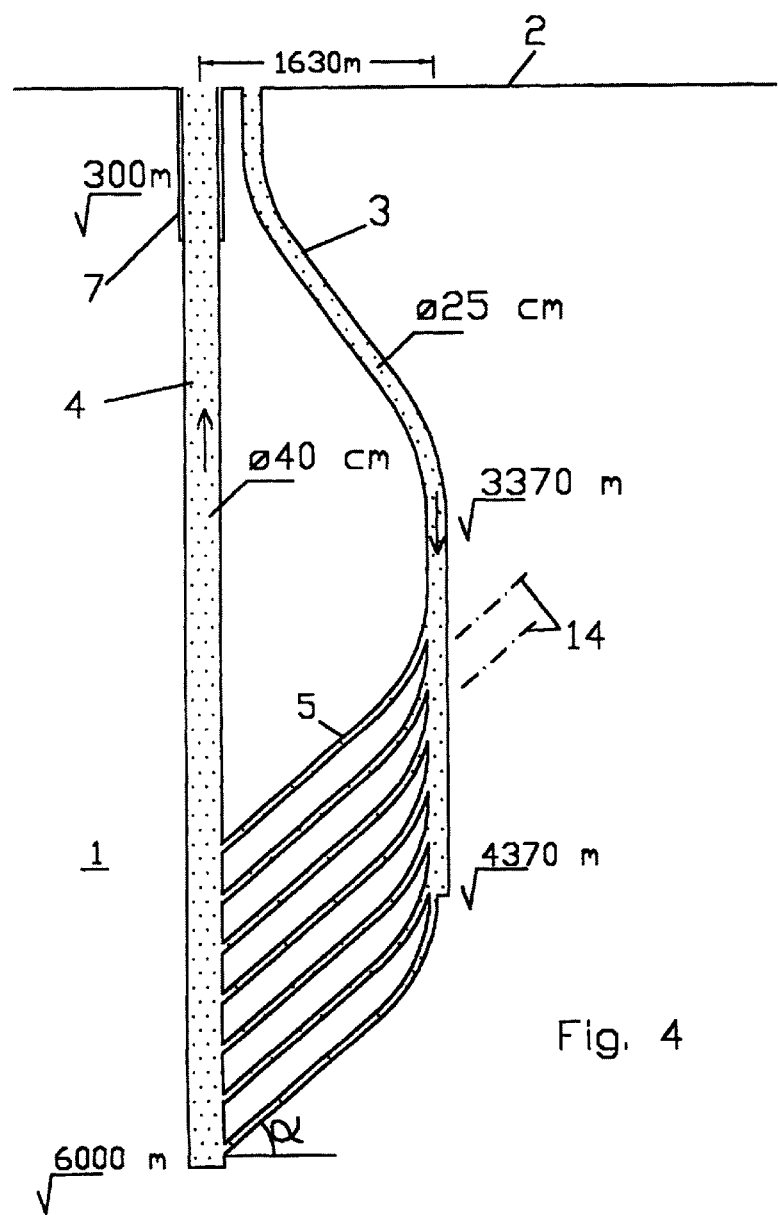

For better understanding of the invention it will be described with reference to the exemplifying embodiments shown in the appended drawings, wherein:

FIG. 1 is a schematic perspective view of a geothermal plant according to the invention, FIG. 2 is a schematic side view of the plant of FIG. 1, FIG. 3 is a schematic plan view of a larger geothermal plant according to the invention, and FIG. 4 is a section along the line IV—IV in FIG. 3.

In the two embodiments shown in the drawings, the same reference numerals have been used for similar parts.

The plant illustrated in FIGS. 1 and 2 is for the major parts located in a geological formation 1 below the earth surface 2. The formation has a heat conductivity of 3 W/m° C. The plant comprises a supply hole 3 with a diameter of 15 cm and a return hole 4 with a diameter of 15 cm. The supply and return holes 3, 4 are interconnected by four heat absorbing holes 5, each having a diameter of 10 cm and being approximately 2000 m long. The spacing between these holes 5 may be 100–150 m. They have been drilled starting out from the supply hole 3 and terminate at or near the return hole 4. A fracture zone 6 has been established in this area to provide flow communication between the holes 4 and 5 since it would be difficult to hit the return hole 4 directly when drilling the heat absorbing holes 5.

The upper parts of the supply and return holes 3, 4 are provided with a casing 7 extending about 300 m into the ground to seal the holes against the surrounding formation in this area.

On the surface, the supply and return holes 3, 4 are connected to one side of a separating heat exchanger 8, and a circulation pump 9 is provided in the supply line 3. An auxiliary pump 10 is located at the lower end of the casing 7 of the return hole 4, the purpose of which is to reduce the pressure in the return hole should water tend to leak from the holes out into the formation 1.

The other side of the separating heat exchanger 8 is in flow communication with various heat consuming appliances exemplified by a radiator 11, a warm air heater 12 and a hot water tank 13.

For reasons of expediency, FIGS. 1 and 2 provide the various temperatures, flow velocities and flow rate and dimensions of the geothermal plant. Furthermore, FIG. 1 indicates that the heat absorbing holes 5 absorb 0.21 kW/m. Considering that the total length of the heat absorbing holes is about 8000 m, they extract close to 1.7 MW from the rock. The same number can be had by multiplying the water flow rate and temperature difference between the supply and return holes. However, for a plant as small as this, the heat loss from the return hole 4 to the surroundings will not be negligible so that the net power of the plant would expectedly be about 1.5 MW.

FIG. 2 shows that the supply hole 3 is vertical and nearly 3200 m long. The heat absorbing holes 5 extend downwards at an angle α equal to about 45° to the horizontal. Considering that they are 2000 m long and adding some length for the curved end portions, the heat absorbing holes could be drilled using a percussion hammer and coiled tubing about 5000 m long.

In determining the number 0.21 kW/m for the heat absorption holes, the inventors have used the result of their calculations mentioned in the introductory part of this specification. These calculations, including a few approximations of little practical importance, have yielded the following equation:

$$Q = K \cdot k^{0.93} \cdot D^{0.2} (0.12 + (t+1)^{-0.1})(T_G - T_W) \cdot l \quad (1)$$

where:

Q is the heat absorbed from the hole in W

K is a constant between 1.7 and 2.0 k is the heat conductivity of the rock in W/m °C., typically about 3 for dense rock $T_G$ is the initial average temperature of the geological formation along the heat absorbing hole $T_W$ is the average water temperature flowing through the heat absorbing hole D is the diameter of the hole in meters l is the length of the hole in meters t is the plant operating time in years Equation (1) assumes a countercurrent type heat exchange and would not be accurate in a co-current situation. The small exponent 0.2 for the diameter D indicates the low influence of the diameter on the heat absorption, while the exponent −0.1 related to the operating time results in the plant losing about 1% of power per year after one year of operation.

The equation can also be used to calculate the heat loss from the return hole 4 with a fair degree of accuracy.

Since equation (1) i.a. shows that the effect of the diameter is quite small and that for economical reasons, the diameter will be held quite low, and since the depletion of the heat in the rock available will proceed quite slowly, equation (1) can be further simplified to the following form:

$$Q = C \cdot (T_G - T_W) \cdot k \cdot l \quad (2)$$

where:

C is a constant between 0.6 and 2.4, the low side being for smaller plants and low temperature gradients in the rock and the high side for larger plants and high temperature gradients.

The embodiment in FIGS. 3 and 4 is a geothermal plant designed for a nominal power of 50 MW and 40 MW average power over 240000 hours of use (60 years at 4000 hours per year). The supply water temperature is 40° C. and the return temperature 100° C., with a water flow rate of about 200 kg/sec. The geological formation 1 consists of granite having a heat conductivity of 4 W/m° C. and the temperature gradient is 30° C./km.

In order to obtain the necessary total length of the heat absorbing holes 5, they have been arranged in three sets 120° apart and feeding into a common return hole 4. Each set of heat absorbing holes 5 consisting of seven layers 14 of heat absorbing holes 5, the layers containing three essentially parallel heat absorbing holes. The spacing between the holes 5 is about 100 m in the horizontal direction and 100–150 m in the vertical direction. Each hole has a diameter of 10 cm and is about 2300 m long. It forms an angle α with the horizontal of about 40°. The supply hole 3 feeding each set of heat absorbing holes has a diameter of 25 cm, and the diameter of the return hole 4 is about 40 cm. This means that the water velocity in the return hole 4 is four times the velocity in the heat absorbing holes 5.

For simplicity, the equipment on the earth surface 2 for utilizing the heat produced by the plant has not been shown. If, after many years of operation the heat in the rock around the heat absorbing holes 5 has been depleted, new heat absorbing holes can be drilled in the sectors between the existing sets, or they may be drilled below the existing holes. Drilling new holes below the existing ones will also be the natural way of increasing or renewing the capacity of the plant shown in FIGS. 1 and 2.

It will be noted that the heat absorbing holes 5 in the FIGS. 3 and 4 embodiment has a total length of bout 145 km. Yet it has about the same thermal power as expected from one km heat absorbing hole in WO 96/23181.

It will be understood that the invention is not limited in any way by the exemplifying embodiments described above, but may be varied and modified in a number of ways without departing from the spirit of the invention and scope of the appended claims.

What is claimed is:

1. A plant for exploiting geothermal energy by circulating water through a geological formation at least 1000 m below the earth surface, comprising at least one supply hole leading from the surface down to said formation, at least one return hole for the transport of heated water from said formation to the surface, and a heat absorbing arrangement connecting the supply and return holes, said arrangement comprising a heat transfer surface across which heat is transferred from said formation to said water, said heat transfer surface comprising at least one drilled heat absorbing hole characterized in that the plant has a given nominal power in MW defined as the heat to be absorbed by said arrangement after one year of operation, and in that the length of said heat absorbing hole is at least about 2600 m multiplied by said nominal power.

2. A plant according to claim 1 characterized in that said heat absorbing arrangement comprises a plurality of drilled heat absorbing holes connecting the supply and return holes in a parallel flow relationship, a substantial part of each heat absorbing hole lying at least 50 m from the nearest heat absorbing hole, the total length of the heat absorbing holes exceeding 5000 m.

3. A plant according to claim 2 characterized in that said heat absorbing holes extend at an angle (α) downwards from the supply hole to the return hole.

4. A plant according to claim 3, characterized in that said angle (α) is between about 20° and 50°.

5. A plant according to claim 2, characterized in that at least a substantial part of the heat absorbing holes extend parallel to each other.

6. A plant according to claim 2, characterized in that the heat absorbing holes (5) are arranged in vertically spaced layers.

7. A plant according to claim 6, characterized in that the distance between adjacent holes in each layer is about the same as the distance between adjacent vertical holes.

8. A plant according to claim 6, characterized in that the said distance between said layers is less than about 150 m.

9. A plant according to claim 2, characterized in that a plurality of supply holes are arranged around a common return hole.

10. A plant according to claim 2, characterized in that the upper ends of said supply hole and said return hole are arranged closely to one another, one of said holes extending generally vertically and the other deviating from the vertical, so as to introduce a substantial spacing between the ends of the heat absorbing holes.

11. A plant according to claim 10 wherein the said spacing is at least 1 km.

12. A plant according to claim 2, characterized in that the heat absorbing holes have a diameter of less than 18 cm.

13. A plant according to claim 12, characterized in that the diameter of said heat absorbing holes is less than 14 cm.

14. A plant according to claim 12 wherein the holes are of a nominal 4" (10 cm) diameter.

15. A method for use in constructing a plant for exploiting geothermal energy by circulating water through a geological formation at least 1000 m below the earth surface, said plant comprising at least one supply hole leading from the surface down to said formation, at least one return hole for the transport of heated water from said formation to the surface, and at least one heat absorbing hole connecting the supply and return holes characterized by dimensioning said at least one absorbing hole in accordance with a solution of the differential equation for heat transfer from a cylinder of homogenous rock material into water flowing through a central hole in said cylinder and using the formula $$Q = K \cdot k^{0.93} \cdot D^{0.2} (0.12 + (t+1)^{-0.1})(T_G - T_W) \cdot 1$$

as an approximation to said solution, the portions of the formula having been defined elsewhere in the specification.

16. A method according to claim 15, characterized by using the formula $$Q = C \cdot (T_G - T_W) \cdot k \cdot 1$$

as an approximation to said solution, the factors of the formula (2) having been defined elsewhere in this specification.

17. A method according to claim 15, characterized in that at least the major parts of the heat absorbing holes are drilled by using a percussion hammer and a coiled tubing drill string.

18. A method for use in constructing a plant for exploiting geothermal energy by circulating water through a geological formation at least 1000 m below the earth surface, said plant comprising at least one supply hole leading from the surface down to said formation, at least one return hole for the transport of heated water from said formation to the surface, and at least one heat absorbing hole connecting the supply and return holes, characterized by forming said heat absorbing hole arranged in a parallel flow relationship, said heat absorbing holes being dimensioned in accordance with the formula $$Q = K \cdot k^{0.93} \cdot D^{0.2} (0.12 + (t+1)^{-0.1})(T_G - T_W) \cdot 1$$

the factors of the formula (1) having been defined elsewhere in this specification.

19. A method for use in constructing a plant for exploiting geothermal energy by circulating water through a geological formation at least 1000 m below the earth surface, said plant comprising at least one supply hole leading from the surface down to said formation, at least one return hole for the transport of heated water from said formation to the surface, and at least one heat absorbing hole connecting the supply and return holes, characterized by forming said heat absorbing hole as a plurality of heat absorbing holes arranged in a parallel flow relationship, said heat absorbing holes being dimensioned in accordance with the formula $$Q = C \cdot (T_G - T_W) \cdot k \cdot 1$$

the factors of the formula (2) having been defined elsewhere in this specification.

20. A plant for exploiting geothermal energy by circulating water through a geological formation at least 1000 m below the earth surface, comprising at least one supply hole leading from the surface down to said formation, at least one return hole for the transport of heated water from said formation to the surface and a heat absorbing arrangement connecting the supply and return holes, said arrangement comprising a heat transfer surface across which heat is transferred from said formation to said water, characterized in that the plant has a given nominal power in MW defined as the heat to be absorbed by said arrangement after one year of operation, and in that said heat transfer surface comprises at least one drilled heat absorbing hole, the total length of which is at least about 1300 m multiplied by said nominal power.

21. A plant according to claim 1, characterized in that a circulation pump is connected to the supply hole and an auxiliary pump is arranged in the return hole.

* * * * *